United States Patent [19]
Lee, Jr.

[11] 3,835,200
[45] Sept. 10, 1974

[54] COMPOSITION OF A POLYPHENYLENE ETHER, A RUBBER STYRENE GRAFT COPOLYMER AND NORMALLY RIGID BLOCK COPOLYMER OF A VINYL AROMATIC COMPOUND AND A CONJUGATED DIENE

[75] Inventor: Gim F. Lee, Jr., Albany, N.Y.

[73] Assignee: General Electric Company, Pittsfield, Mass.

[22] Filed: Aug. 23, 1972

[21] Appl. No.: 283,092

[52] U.S. Cl. ..... 260/876 B, 260/41.5 R, 260/47 ET, 260/876 R, 260/880 R, 260/880 B
[51] Int. Cl. ..................... C08g 15/00, C08f 19/00
[58] Field of Search ................ 260/876 R, 876 R

[56] References Cited
UNITED STATES PATENTS

| | | | |
|---|---|---|---|
| 3,383,435 | 5/1968 | Cizek | 260/876 |
| 3,639,506 | 2/1972 | Haaf | 260/876 |
| 3,639,508 | 2/1972 | Kambour | 260/876 R |
| 3,663,654 | 5/1972 | Haaf | 260/876 |
| 3,663,661 | 5/1972 | Katchman | 260/876 |

*Primary Examiner*—Paul Lieberman
*Attorney, Agent, or Firm*—William F. Mufatti; Finnegan, Jr. George B.; Rocco S. Barrese

[57] ABSTRACT

There are provided compositions comprising a polyphenylene ether, a graft copolymer of a diene rubber with a styrene monomer and a normally rigid block copolymer of a vinyl aromatic compound and a conjugated diene. The addition of the normally rigid block copolymer resin to polyphenylene ethers in combination with graft copolymers of a diene rubber and a styrene monomer provides unexpected improvements in toughness in parts molded from the composition. Such properties are improved without substantially impairing glass or surface appearance.

12 Claims, No Drawings

COMPOSITION OF A POLYPHENYLENE ETHER, A RUBBER STYRENE GRAFT COPOLYMER AND NORMALLY RIGID BLOCK COPOLYMER OF A VINYL AROMATIC COMPOUND AND A CONJUGATED DIENE

This invention relates to novel resin compositions and more particularly, to polymer compositions comprising a polyphenylene ether, a graft copolymer of a diene rubber with a styrene monomer and a normally rigid block copolymer of a vinyl aromatic compound and a conjugated diene.

BACKGROUND OF THE INVENTION

The polyphenylene ethers are known and described in numerous publications including Hay, U.S. Pat. Nos. 3,306,874 and 3,306,875 and Stamatoff, U.S. Pat. Nos. 3,257,357 and 3,257,358. The high molecular weight polyphenylene ethers are high performance engineering thermoplastics possessing relatively high melt viscosities and softening points -- i.e., in excess of 275°C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by blending them with other resins. For example, one method for improving the melt processability of the polyphenylene ethers is disclosed in a commonly-assigned patent, U.S. Pat. No. 3,379,792, incorporated herein by reference. According to this patent, flow properties of the polyphenylene ethers are improved by blending with from about 0.1 to 25 parts by weight of a polyamide. In another commonly-assigned patent, U.S. Pat. No. 3,351,851, a polyphenylene ether composition comprising a polyphenylene ether blended with a polyolefin is disclosed. The polyolefin is added to improve impact strength and resistance to aggressive solvents. In a third commonly-assigned patent, U.S. Pat. No. 3,383,435, there are provided means for simultaneously improving the melt processability of the polyphenylene ether resins while simultaneously up-grading many properties of polystyrene homopolymer and random copolymer resins. The invention of U.S. Pat. No. 3,383,435 is based upon the discovery that the polyphenylene ether resins and such polystyrene resins, including rubber modified polystyrene resins, are combinable in all proportions and result in compositions having many properties improved over those of either of the components.

One preferred embodiment of U.S. Pat. No. 3,383,435 is a composition comprising a high-impact, rubber reinforced polystyrene and a poly(2,6-dialkyl-1,4-phenylene)ether. This composition was preferred because it provided the aforementioned objectives of improving the melt-processability properties of the polyphenylene ether resin and provided the further advantage of improving impact resistance of parts molded from the blend. Furthermore, such compositions of polyphenylene ethers and high impact polystyrenes could be custom-formulated to provide predetermined properties ranging between those of the polystyrene and those of the polyphenylene ether by controlling the ratio of the two polymers. The reason for this is that the compositions exhibit a single set of thermodynamic properties rather than two distinct sets of properties -- i.e., one for each of the components as is typical with blends of prior art.

The styrene resins disclosed in U.S. Pat. No. 3,383,435 are either homopolymers or copolymers which are random or grafted. For example, the crystal polystyrenes of Examples 1 and 9 are homopolymers. On the other hand, Lustrex HT-88 of Example 7 is a commerical styrene grafted butadiene rubber modified high impact polystyrene. In such products a portion of the styrene is homopolymerized into side chains onto a rubber backbone. The other styrene containing copolymer resins disclosed in U.S. Pat. No. 3,383,435, Col. 3, also include both random and grafted copolymers: styrene acrylonitrile, styrene-butadiene, styrene-acrylonitrile-$\alpha$-alkyl styrene copolymers, styrene-acrylonitrile-butadiene (ABS), copolymers of ethylvinyl benzene and divinyl benzene and the like.

None of the copolymers specifically disclosed in U.S. Pat. No. 3,383,435 is a block copolymer. The term "block copolymer" is meant to include linear polymeric chains with runs of repeating homopolymer units. For example, they can comprise two homopolymer blocks of vinyl aromatic compound (A) and a conjugated diene (B) of the type A-A-A-A-B-B-B-B, or, simply, type A-B; or they can comprise three homopolymer blocks wherein $A^1$ is the same as A or different of the type A-A-B-B-B-$A^1$ or, simply, A-B-A or A-B-$A^1$. If the average molecular weight of the segments comprising diene repeating units is higher than that of the segments comprising A or $A^1$ units, the block copolymers will be normally resilient. On the other hand, if the molecular weight of the A and $A^1$ units is higher, the block copolymer will be normally rigid. In any event, block copolymers differ basically from graft copolymers because the former are essentially linear, and, they differ from random copolymers because they have homopolymer blocks of relatively uniform molecular weight distribution, because in the former the length of the units can be controlled by interrupting the process temporarily or permanently, while in the latter, the relative reactivity ratio of the comonomers controls which is added to the growing chain at any given time.

It is believed that the impact resistance of the polyphenylene ether is improved according to the teachings in U.S. Pat. No. 3,383,435 because of the diene rubber content in the backbone of the side-chain grafted high-impact polystyrene and in the ABS resin and, in this respect, the improvement in impact strength appears to be directly proportional to the diene rubber content of the polystyrene resin or the ABS resin, increasing concentrations of diene rubber resulting in increased impact strength. However, it has also been found — as a disadvantage — that the gloss of parts molded from the polyphenylene ether resin and the high-impact polystyrene resin is inversely proportional to the diene rubber content and that, therefore, as the diene rubber content is increased, gloss and surface appearance of the molded parts are decreased. Consequently, increasing the diene rubber content of the compositions results in increased impact strength, but with a sacrifice in surface appearance and gloss. Alternatively, reduction in diene rubber content such as by the use of unreinforced (crystal) polystyrene results in parts having good gloss, but at a sacrifice in impact strengths. Because both impact strength and gloss are commercially important properties in the manufacture of molded parts, although the preferred compositions of the prior art provide the advantages noted above, it has been found difficult to provide compositions having both optimum impact strength and surface appearance.

In copending application, Ser. No. 201,104, filed Nov. 22, 1971, it is disclosed that an elastomeric block copolymer of a vinyl aromatic compound (A) and (A)$^1$ and a conjugated diene (B), of the A-B-A$^1$ type, A and A$^1$ being the same or different, and the molecular weight of the center block being higher than that of the terminal blocks, will impart unexpectedly high impact strengths and chemical resistance properties both to polyphenylene ether resins and compositions of polyphenylene ether resins and polystyrene homopolymer and graft or random copolymer resins.

In R. P. Kambour, U.S. Pat. No. 3,639,508, it is disclosed that block copolymers of the A-B and A-B-A type having from 10 to 90 percent by weight of A units can be blended with polypropylene ether resins or matrixes of polyphenylene ether resins and polystyrene homopolymers to give improved heat distortion and transparency. There is no disclosure of ternary blends comprising the block copolymers, polyphenylene ether resins and graft copolymers of polystyrene and rubber and Kambour shows only that such graft copolymers cause a very considerable decrease in transparency in binary blends with polyphenylene ethers.

R. L. Lauchlin et al, U.S. Pat. No. 3,660,531 and in copending application, Ser. No. 17,976, filed Mar. 9, 1970, it is disclosed that elastomeric block copolymers can be blended with polyphenylene ether resins or matrixes of polyphenylene ether resins and polystyrene homopolymers or graft copolymers with diene rubbers. In the patent it is emphasized that the block copolymers must be leathery or rubbery in nature at normal, i.e., ambient temperature, and, by reference to "Properties and Structures of Polymers" A. V. Tobolsky, pages 71–78, John Wiley & Sons (1960), these normally leathery or rubbery block copolymers are stated to have Young's moduli between $10^5$ and $10^9$ dynes/cm$^2$. The patent states that polymeric materials which are glassy at ambient temperature, i.e., those which are normally rigid, and, which have Young's moduli in excess of $10^9$ dynes/cm.$^2$ by reference to the Tobolsky work, are not at all acceptable in the disclosed compositions.

It has now been discovered that a normally rigid block copolymer compound of the A-B-A type will combine with polyphenylene ether resins and graft copolymers of diene rubbers and styrene monomers to provide uniquely advantageous and unexpected properties.

The new compositions differ from those of the said copending applications Ser. No. 17,976, Ser. No. 201,174 and Lauchlin et al, U.S. Pat. No. 3,660,531 because the block copolymers in the said applications and patent are always normally resilient or leathery, i.e., elastomeric, while the block copolymers used herein are normally rigid, i.e., glassy at room temperature and have a Young's modulus of greater than $10^9$ dynes/cm$^2$. The new compositions differ from those of Kambour, U.S. Pat. No. 3,639,508, because the compositions in that patent are stated to have only a styrene homopolymer in the matrix with the polyphenylene ether, and never a graft copolymer of styrene monomer and diene rubber as is required herein.

While the reasons for this are not clearly understood, use of the normally rigid A-B-A block copolymers in the instant composition appears to be limited to matrixes with polyphenylene ether resin which also must include at least a small amount of a diene rubber-styrene monomer graft interpolymerization product, while with the elastomeric A-B-A block copolymers of the said copending applications Ser. Nos. 17,976; 201,174 and the Lauchlin patent the presence of the graft copolymerization product is entirely optional.

Moreover, it has been discovered, unexpectedly, that in compositions according to this invention of polyphenylene ether and rubber modified styrene resins, higher resistance to impact can be obtained by using a mixture of a normally rigid A-B-A type block copolymer and a graft interpolymerization product of a diene rubber with a styrene monomer than can be obtained if either the block copolymer or the graft copolymer is used alone as the entire rubber modified styrene component, and there is nothing in the Kambour patent to suggest that anything other than a merely additive effect will be obtained.

DESCRIPTION OF THE INVENTION

According to the present invention there are provided normally rigid thermoplastic compositions comprising a. a matrix comprising a polyphenylene ether resin and and a grafted interpolymerization product of a styrene monomer and a diene rubber and b. a normally rigid block copolymer of a vinyl aromatic compound (A) and a conjugated diene (B), of the A-B-A type, blocks (B) being of lower average molecular weight than those of blocks (A), component (b) being present in an amount of from about 10 to about 80 percent weight of the total resinous components of the composition.

Preferred compositions will be those in which the polyphenylene ether comprises at least 1 percent by weight of the total resinous components in the composition.

It is to be understood, however, that the present compositions can also include conventional amounts of conventional additives for processability, flame retardancy, stability and the like.

Preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular CaSiO$_3$, asbestos, TiO$_2$, titanate whiskers, glass flakes and fibers and the like. Such reinforcements will be present in an amount of, e.g., 2 to 90 percent by weight, preferably 10 to 60 percent by weight. Especially preferred as a reinforcement is fibrous glass.

In preferred compositions the polyphenylene ether resins in component (a) will be those having repeating structural units of the formula

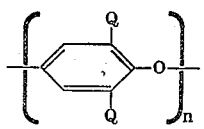

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom -- i.e., where each Q is alkyl, most preferably, having from 1 to 4 carbon atoms. The most preferred polyphenylene ether resin for purposes of the present invention is poly(2,6-dimethyl-1,4-phenylene) ether (each Q is methyl).

With respect to component (b), normally rigid block copolymers of vinyl aromatic compounds and conjugated dienes are made by means well known in the art and are also available commercially.

Block copolymers of vinyl aromatic compounds and conjugated dienes are described in Kennedy, et al Editor, Polymer Chemistry of Synthetic Elastomers, Interscience, Vol. 23, Part II, 1969, pages 533–559. In general, they will be of the A-B-A type in which the relative ratios of the homopolymer blocks can vary. In the compositions of this invention, however, blocks B will always be those of a conjugated diene, e.g., butadiene; isoprene, 1,3-pentadiene; 2,3-dimethyl-butadiene, and the like or mixtures of the foregoing. Blocks A will always be derived from a vinyl aromatic compound, e.g., styrene, α-methyl styrene, vinyl toluene, vinyl xylene, vinyl naphthalene, or mixtures of any of the foregoing. In the most preferred compositions, the block copolymer will have blocks A comprised of polystyrene and blocks B comprised of polybutadiene. The most preferred block copolymer will be of the radial teleblock structure, "teleblock" being used to designate copolymers with terminal block segments of one of the monomers used to produce them; in this case the terminal blocks will be vinyl aromatic, e.g., from styrene. "Radial" means a network in which the polystyrene blocks make the rubber thermoplastic (by virtue of the greater weight content) and association provides a network of plastic areas connected by flexible diene rubber blocks so the material has excellent mechanical properties without vulcanization. Although they are normally rigid, the radial teleblock polymers soften and flow with heat and can be molded and extruded in the same manner as other thermoplastic materials. They can be remolded repeatedly without loss in properties.

The ratio of the comonomers can vary broadly, so long as the average molecular weights of combined blocks B is less than that in combined terminal blocks A and $A^1$. This appears to be necessary for the impact strength to be maximized and to obtain the unexpected enhancement. Preferably, with the above limitation, the molecular weight of the diene-derived block B will range from about 2,000 to about 100,000, while that of the vinyl aromatic blocks A and $A^1$ will range from about 25,000 to about 1,000,000. In any event, in preferred copolymers, the aromatic compound units will comprise from about 65 to about 85 percent by weight and the diene units will comprise from about 15 to about 45 percent by weight.

The block copolymers are made by an organolithium initiated polymerization process in hydrocarbon solution using, for example, butadiene and styrene or other diene and vinyl aromatic monomers as is described in Kennedy et al, mentioned above.

In one process, the block copolymer is prepared by dissolving the conjugated diene, e.g., butadiene, in an aromatic hydrocarbon solvent, e.g., xylene, toluene, etc., and adding 0.3 to 7.5 millimoles/100 parts of monomer of an organolithium initiator, e.g., n-butyl lithium, etc. Polymerization of the diene is completed and then the vinyl aromatic compound is added and polymerization of this is completed to form the block copolymer. The product is precipitated and deactivated, e.g., with alcohol, such as ethanol or isopropanol and purified by redissolving in hydrocarbon and reprecipitating with alcohol.

In another process, the block copolymer is formed using, e.g., a secondary or tertiary alkyl lithium compound at about 100-2,000 parts per million based on the total weight of the monomers and a polymerization temperature in the range 20°–65°C. For example, styrene is dissolved in cyclohexane at 32°C. and treated with 5,530 parts per million of secondary butyl lithium. After polymerization is complete, isoprene is injected and polymerization is continued at 55°–57°C. The product can be recovered as described above.

Suitable styrene-butadiene block copolymer resins are also available commercially, e.g., as KRO-1 and KRO-3 from Phillips Petroleum Company. KRO-1 contains about 73.6 wt. percent of pure polystyrene blocks, balance, polybutadiene blocks, the polybutadiene having greater than 90 percent of the cis-1,4-microstructure. The intrinsic viscosity in a typical sample is 0.67 dl./g. (in chloroform at 25°C.). KRO-3 is like KRO-1, but the styrene content is about 75.8 wt. percent and the intrinsic viscosity is slightly lower, 0.64 dl./g. The glass transition point of the polybutadiene segments in each case is about –90°C. KRO-1 shows a bimodal molecular weight distribution by gel phase chromatography. KRO-3 has a smaller, low molecular weight peak.

As noted above, the normally rigid block copolymer resin is to be combined with the polyphenylene ether resin and a third, graft copolymer resin, i.e., the interpolymerization product of a diene rubber and a styrene monomer, commonly known as high impact polystyrene resins. As disclosed in the above-mentioned patent, U.S. Pat. No. 3,383,435, the rubber modified graft copolymer styrene resins most readily combinable with the polyphenylene ether resin will be those having at least 25 percent by weight polymer units derived from vinyl aromatic monomer having the formula

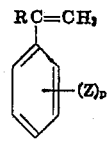

where R is hydrogen, alkyl of 1 to 4 carbon atoms or halogen; Z is a member selected from the class consisting of vinyl, hydrogen, or alkyl of from 1 to 4 carbon atoms; and p is from 1 to 5. Such compositions will comprise from 1 to 99 percent by weight of the polyphenylene ether component and from 99 to 1 percent by weight of the polystyrene resin. The preferred styrene resin for purposes of this invention is one comprising a styrene homopolymer grafted onto from about 3 to 30, preferably from 4 to 12 percent by weight of a polybutadiene or a rubbery diene copolymer backbone, e.g., of about 70 percent BD and 30 percent styrene. Such graft interpolymerization products can be made by well-known techniques. For example, a solution of diene rubber, as above defined, in a vinyl aromatic monomer, as above defined, is heat polymerized in the absence of a catalyst, or prepolymerized with an initiator (for instance, azo-bis-isobutyronitrile) having a relatively low grafting ability until phase-inversion occurs, and then the pre-polymer is subjected to suspension polymerization by addition of a initiator having a large grafting ability (for instance, benzoyl peroxide). See for further details, U.K. 1,013,498.

The amount of normally rigid block copolymer resin added to the polyphenylene ether resin composition with the grafted, rubber-modified polystyrene may vary within rather broad limits, but preferably ranges from about 10 to 80 percent by weight of the resinous components.

In a preferred family of compositions the polyphenylene ether comprises from about 1 to about 90 percent by weight, the normally rigid block copolymer of a vinyl aromatic compound and a conjugated diene comprises from about 10 to about 80 percent by weight, and the grafted interpolymerization product of a styrene monomer and a diene rubber component comprises from about 1 percent to the remainder by weight of the total weight of the resinous components in said composition. Especially preferred are compositions in which the polyphenylene ether is poly(2,6-dimethyl-1,4-phenylene)ether and comprises from about 20 to about 90 percent by weight, component (b) is a normally rigid block copolymer of styrene and butadiene of the poly(styrene-butadiene) type and comprises from about 10 to about 80 percent by weight and the grafted interpolymerization product is of styrene monomer and a polybutadiene and comprises from 10 up to about 60 percent by weight of the total weight of the resinous components in the composition.

It should be obvious that other additives may be present in the compositions such as plasticizers, pigments, flame retardants and stabilizers in amounts varying between about 1 and 30 percent by weight of the total composition. The above-stated range for the normally rigid block copolymer resin, the polyphenylene ether resin and the grafted diene rubber-styrene resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous form — as the case may be — extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of a normally rigid vinyl aromatic, conjugated diene A-B-A block copolymer resin with a polyphenylene ether resin in combination with a graft copolymer resin are illustrated in the following examples which are set forth as a further description of the invention, but are not to be construed as limiting the invention thereto.

EXAMPLES 1-3

The following formulations are mechanically blended then co-extruded in a ¾ inch Wayne-type extruder and molded into test pieces in a 3 oz. Newbury injection molding machine. The block copolymer and the graft rubber — polystyrene copolymer are masterbatched first. The physical tests are carried out by the following procedures: ⅛ inch notched Izod Impact Strength, ASTM D-256-56; Tensile yield strength and elongation, ASTM D-639-61T. Formulations and physical properties are as follows:

Table 1.

Compositions of Polyphenylene Ether, Butadiene-Styrene A-B Block Copolymer and Graft Interpolymer of Polybutadiene-Polystyrene.

| Example | 1A* | 1 | 2 | 3 | 3A* |
|---|---|---|---|---|---|
| Ingredients (parts by weight) | | | | | |
| poly(2,6-dimethyl-1,4-phenylene)ether** | 40 | 40 | 40 | 40 | 40 |
| poly(butadiene-styrene) A-B-A blocks*** | — | 15 | 30 | 45 | 60 |
| grafted high impact rubber modified polystyrene resin**** | 60 | 45 | 30 | 15 | — |
| Properties | | | | | |
| Tensile yield strength, psi. | 9600 | 9500 | 9100 | 9200 | 8600 |
| Elongation, % | 42.9 | 31.9 | 34.7 | 38.0 | 47.6 |
| Izod impact strength, ft.-lbs./in. notch | 1.86 | 2.05 | 2.72 | 1.94 | 1.66 |

\* Control
\*\* General Electric Company, PPO in powder form, intrinsic viscosity 0.40–0.65 dl./g.
\*\*\* Phillips Petroleum Co., KRO-1, normally rigid block copolymer of butadiene, styrene; 75.8 wt. % polystyrene, balance polybutadiene (having greater than 90% cis-1,4-microstructure), intrinsic viscosity 0.67 dl./g (chloroform at 25°C.)
\*\*\*\* Cosdon Co., 825-TV containing about 8% by weight of polybutadiene, and having homopolystyrene grafted side chains; particulate rubber phase mean diameter about 5 microns.

Surprisingly, the impact strengths of the compositions containing both the block and the graft copolymers are higher than those with either alone (1A and 3A).

EXAMPLES 4–6

The procedure of Examples 1–3 is repeated, substituting a different block copolymer of styrene-butadiene. The formulations and properties of the molded specimens are outlined in Table 2:

Table 2.

Compositions of Polyphenylene Ether, Butadiene-Styrene A-B Block Copolymer and Graft Interpolymer of Polybutadiene-Polystyrene

| Example | 4A* | 4 | 5 | 6 | 6A* |
|---|---|---|---|---|---|
| Ingredients (parts by weight) | | | | | |
| poly(2,6-dimethyl-1,4-phenylene)ether as in Examples 1–3 | 40 | 40 | 40 | 40 | 40 |
| poly(butadiene-styrene) A-B-A blocks** | — | 15 | 30 | 45 | 60 |
| grafted high impact rubber modified polystyrene resin, as in Examples 1–3 | 60 | 45 | 30 | 15 | — |
| Properties | | | | | |
| Tensile yield strength, psi | 9600 | 9500 | 9300 | 8900 | 8100 |
| Elongation, % | 42.9 | 26.7 | 50.5 | 65.6 | 65.8 |
| Izod impact strength, ft.-lbs./in. notch | 1.86 | 2.16 | 3.28 | 2.74 | 1.60 |

* Control
** Phillips Petroleum Co., KRO-3, rigid block copolymer of butadiene, styrene; 75.8% polystyrene content, balance polybutadiene (having greater than 90% cis-1,4-microstructure), intrinsic viscosity 0.64 dl./g.

As in Examples 1–3, Examples 4–6 according to this invention provide compositions with higher impact strength than the controls.

EXAMPLES 7–9

The procedure of Examples 4–6 is repeated, substituting a different graft copolymer of diene rubber and styrene monomer. The formulations and properties of the molded specimens are outlined in Table 3:

Table 3.

Compositions of Polyphenylene Ether, Butadiene-Styrene A-B Block Copolymer and Graft Interpolymer of Polybutadiene and Polystyrene

| Example | 7A* | 7 | 8 | 9 | 9A* |
|---|---|---|---|---|---|
| Ingredients (parts by weight) | | | | | |
| poly(2,6-dimethyl-1,4-phenylene)ether as in Examples 1–3 | 40 | 40 | 40 | 40 | 40 |
| poly(butadiene-styrene) A-B- blocks, as in Examples 4–6 | — | 15 | 30 | 45 | 60 |
| grafted high impact rubber modified polystyrene resin** | 60 | 45 | 30 | 15 | — |
| Properties | | | | | |
| Tensile yield strength, psi | 8500 | 8300 | 8300 | 8400 | 8100 |
| Elongation, % | 48.6 | 60.3 | 68.0 | 56.7 | 77.2 |
| Izod impact strength, ft.-lbs./in. notch | 3.86 | 3.86 | 4.72 | 5.41 | 1.68 |

* Control.
** Foster Grant Co., FG-834, containing about 9% by weight of polybutadiene, and having homopolystyrene grafted side chains; particulate rubber phase mean diameter about 1.5 microns.

EXAMPLES 10–12

The procedure of Examples 4–6 is repeated, substituting a different graft copolymer of diene rubber and styrene monomer. The formulations and properties of the molded speciments are outlined in Table 4:

Table 4.

Compositions of Polyphenylene Ether, Butadiene-Styrene A-B Block Copolymer and Graft Interpolymer of Polybutadiene and Polystyrene

| Example | 10A* | 10 | 11 | 12 | 12A* |
|---|---|---|---|---|---|
| Ingredients (parts by weight) | | | | | |
| poly(2,6-dimethyl-1,4-phenylene)ether as in Examples 1–3 | 40 | 40 | 40 | 40 | 40 |
| poly(butadiene-styrene) A-B-A blocks, as in Examples 4–6 | — | 15 | 30 | 45 | 60 |
| grafted high impact rubber modified polystyrene resin** | 60 | 45 | 30 | 15 | — |

Table 4.—Continued

Compositions of Polyphenylene Ether, Butadiene-
Styrene A-B Block Copolymer and Graft Interpolymer of
Polybutadiene and Polystyrene

| Example | 10A* | 10 | 11 | 12 | 12A* |
|---|---|---|---|---|---|
| Properties |  |  |  |  |  |
| Tensile yield strength, psi | 8800 | 8800 | 8700 | 8600 | 8600 |
| Elongation, % | 51.8 | 77.4 | 86.6 | 88.6 | 90.4 |
| Izod impact strength, ft.-lbs./in. notch | 3.07 | 3.14 | 4.24 | 4.24 | 1.86 |

\* Control.
\*\* Foster Grant Co., FG-880, containing polybutadiene, and having homopolystyrene grafted side chains; particulate rubber phase mean diameter about 10 microns.

EXAMPLES 13–15

The procedure of Examples 7–9 is repeated, decreasing the amount of polyphenylene ether in the composition. The formulations and properties of the molded specimens are outlined in Table 5:

Table 5.

Compositions of Polyphenylene Ether, Butadiene-
Styrene A-B Block Copolymer and Graft Interpolymer of
Polybutadiene and Polystyrene

| Example | 13A* | 13 | 14 | 15 | 15A* |
|---|---|---|---|---|---|
| Ingredients (parts by weight) |  |  |  |  |  |
| poly(2,6-dimethyl-1,4-phenylene)ether as in Examples 1–3 | 30 | 30 | 30 | 30 | 30 |
| poly(butadiene-styrene) A-B-A blocks, as in Examples 4–6 | — | 27.5 | 35 | 42.5 | 70 |
| grafted high impact rubber modified polystyrene resin as in Examples 7–9 | 70 | 42.5 | 35 | 27.5 | — |
| Properties |  |  |  |  |  |
| Tensile yield strength, psi | 7600 | 7900 | 7800 | 7900 | 7400 |
| Elongation, % | 35.1 | 41.6 | 48.3 | 36.6 | 32.6 |
| Izod impact strength, ft.-lbs./in. notch | 3.70 | 5.62 | 6.26 | 4.58 | 1.58 |

\* — Control.

Thus the compositions of this invention (Examples 13–15) are seen to have superior tensile yield strength, elongation and impact strength, in comparison to the controls.

EXAMPLE 16

The following formulation is blended, molded and tested by the procedure of Examples 1–3:

| Ingredients | Parts by weight |
|---|---|
| poly(1,6-dimethyl-1,4-phenylene) ether (as in Examples 1–3) | 20 |
| normally rigid block copolymer resin (as in Examples 1–3) | 30 |
| rubber modified styrene resin (as in Example 1) | 30 |
| ⅛" fibrous glass reinforcement | 20 |

A reinforced composition according to this invention is obtained.

Other modifications can be made, based on the teachings of the foregoing specific examples.

For example, if the procedure of Examples 1–3 is repeated, substituting for the polybutadiene rubber modified high impact polystyrene resin, a rubbery butadiene-styrene copolymer (78 percent BD -22 percent Styrene) modified polystyrene, a composition according to this invention will be obtained.

If the procedure of Examples 1–3 is repeated, substituting for the block copolymer of polystyrene-polybutadiene, respectively, block copolymers of polystyrene-polyisoprene; or
polyisoprene-poly(α-methylstyrene), high impact compositions will be obtained.

If the procedure of Examples 1–3 is repeated, substituting for the block copolymer, block copolymers having the following indicated weight percent compositions:

| polystyrene-polybutadiene | 65 – 35 |
| polystyrene-polybutadiene | 85 – 15 | high impact compositions according to this invention will be obtained.

If the following polyphenylene ethers are substituted for poly(2,6-dimethyl-1,4-phenylene) ether in the formulation of Examples 1–3:

poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether; or
poly(2-ethyl-6-propyl-1,4-phenylene)ether, compositions according to this invention will be obtained.

Obviously, other modifications and variations of the present invention are possible in the light of the above teachings. It is, therefore, to be understood that changes may be made in the particular embodiments of the invention described which are within the full intended scope of the invention as defined by the a appended claims.

I claim:

1. A normally rigid thermoplastic composition comprising
   a. a matrix comprising a polyphenylene ether resin and a grafted interpolymerization product of a styrene monomer and a diene rubber and
   b. a normally rigid block copolymer of a vinyl aromatic compound (A) and a conjugated diene (B), of the A-B-A type, blocks (B) being of lower average molecular weight than those of blocks (A), wherein said vinyl aromatic compound (A) is selected from the group consisting of styrene, α-methyl styrene, vinyl toluene, vinyl xylene, and vinyl naphthalene, said conjugated diene (B) is selected from the group consisting of butadiene, isoprene, 1,3-pentadiene, and 2,3-dimethylbutadiene, wherein said grafted interpolymerization product is comprised of at least 25 percent by weight polymer units derived from said styrene monomer, and wherein said polyphenylene ether resin comprises from about 1 to about 90 percent by weight, said normally rigid block copolymer comprises from about 10 to 80 percent by weight and said grafted interpolymerization product comprises from about 1 percent to the remainder by weight of the total weight of the resinous components in said composition.

2. A composition as defined in claim 1 wherein said polyphenylene ether resin is of the formula

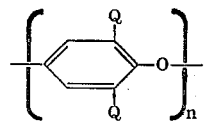

wherein the oxygen ether atom of one unit is connected to the benzene nucleus of the next adjoining unit; n is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

3. A composition as defined in claim 2 wherein each Q is alkyl having from 1 to 4 carbon atoms.

4. A composition as defined in claim 2 wherein each Q is methyl.

5. A composition as defined in claim 1 wherein, in component (b), (A) is a styrene block, (B) is a butadiene block, the polymer being of the radial teleblock structure.

6. A composition as defined in claim 5 wherein, in component (b), the aromatic compound units comprise from about 65 to about 85 percent by weight and the diene units comprise from about 15 to about 45 percent by weight of said block copolymer or mixture thereof.

7. A composition as defined in claim 1 wherein component (a) comprises
   i. a polyphenylene ether of the formula

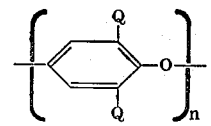

wherein Q is alkyl from 1 to 4 carbon atoms and n is an integer of at least 50 and
   ii. a grafted interpolymerization product of a diene rubber and has at least 25% of the grafted polymer units derived from a vinyl aromatic compound of the formula

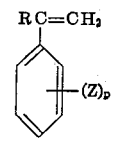

wherein R is hydrogen, alkyl of from 1 to 4 carbon atoms or halogen, Z is hydrogen, alkyl of from 1 to 4 carbon atoms or vinyl and p is an integer of from 1 to 5.

8. A composition as defined in claim 7 wherein the diene rubber comprises a butadiene rubber or a rubbery copolymer of butadiene and styrene in an amount of from about 4 to about 12 percent by weight of said grafted interpolymerization product.

9. A composition as defined in claim 7 wherein the polyphenylene ether is poly(2,6-dimethyl-1,4-phenylene)ether.

10. A composition as defined in claim 1 wherein said polyphenylene ether is poly(2,6-dimethyl-1,4-phenylene)ether and comprises from about 20 to about 90 percent by weight, the normally rigid block copolymer comprises styrene and butadiene and is of the poly(styrene-butadiene) type and comprises from about 10 to about 80 percent by weight and the grafted interpolymerization product is of styrene monomer and polybutadiene and comprises from 10 to about 60 percent by weight of the total weight of the resinous components in said composition.

11. A reinforced composition as defined in claim 1 including a reinforcing amount of fibrous glass.

12. A composition as defined in claim 1 wherein said polyphenylene ether is poly(2,6-dimethyl-1,4-phenylene) ether and comprises from about 20 to about 90 percent by weight, the normally rigid block copolymer comprises styrene and butadiene and is of the poly(styrene-butadiene) type and comprises from about 10 to about 80 percent by weight and the grafted interpolymerization product is of styrene monomer and polybutadiene and comprises from 10 to about 60 percent by weight of the total weight of the resinous components in said composition, wherein said grafted interpolymerization product is comprised of from about 4 to about 12 percent by weight of said polybutadiene.

* * * * *